(12) United States Patent
West et al.

(10) Patent No.: US 8,262,754 B2
(45) Date of Patent: Sep. 11, 2012

(54) CATALYST STRUCTURE FOR A RAPID REACTION

(75) Inventors: David James West, Ducklington (GB);
Michael Joseph Bowe, Preston (GB);
Stuart Leigh Jones, Birmingham (GB);
Clive Derek Lee-Tuffnell, Poole (GB);
Robert Peat, Longcot (GB)

(73) Assignee: CompactGTL plc, Abingdon, Oxfordshire (GB)

( * ) Notice: Subject to any disclaimer, the term of this patent is extended or adjusted under 35 U.S.C. 154(b) by 542 days.

(21) Appl. No.: 11/743,724

(22) Filed: May 3, 2007

(65) Prior Publication Data
US 2007/0258883 A1 Nov. 8, 2007

(30) Foreign Application Priority Data

May 8, 2006 (GB) .................................. 0608927.0
Jan. 10, 2007 (GB) .................................. 0700402.1

(51) Int. Cl.
*B01J 8/00* (2006.01)
(52) U.S. Cl. ........ 48/127.9; 422/625; 422/643; 429/423
(58) Field of Classification Search .......... 422/129–242; 48/61–118.5, 127.9
See application file for complete search history.

(56) References Cited

U.S. PATENT DOCUMENTS

| | | | |
|---|---|---|---|
| 3,920,583 A | 11/1975 | Pugh | |
| 4,134,425 A | 1/1979 | Gussefeld et al. | |
| 4,289,652 A | 9/1981 | Hunter et al. | |
| 4,302,360 A * | 11/1981 | Haruta et al. | 502/324 |
| 4,471,821 A | 9/1984 | Coulon et al. | |
| 4,559,207 A * | 12/1985 | Hiller et al. | 422/197 |
| 5,592,521 A | 1/1997 | Hill | |
| 2002/0071797 A1 | 6/2002 | Loffler et al. | |
| 2003/0105172 A1* | 6/2003 | Bowe et al. | 518/728 |
| 2004/0034111 A1 | 2/2004 | Tonkovich et al. | |
| 2004/0141893 A1 | 7/2004 | Martin | |
| 2004/0228780 A1 | 11/2004 | Butler et al. | |
| 2006/0035182 A1 | 2/2006 | Hesse et al. | |

FOREIGN PATENT DOCUMENTS

DE 19852951 5/2000
(Continued)

OTHER PUBLICATIONS

Foreign Search Report from a Related Application, Jun. 8, 2007.
(Continued)

*Primary Examiner* — Imran Akram
(74) *Attorney, Agent, or Firm* — McDermott Will & Emery LLP

(57) ABSTRACT

A compact catalytic reactor (20) comprises a channel for a rapid reaction having an inlet (26) for a gas mixture to undergo the reaction. The channel is provided with two different catalyst structures (32, 34), a first catalyst structure (32) in the vicinity of the inlet (26) and a second catalyst structure (34) further from the inlet, such that a gas mixture supplied to the inlet flows past them both. The first catalyst structure (32) has little catalytic activity for the rapid reaction, whereas the second catalyst structure (34) has catalytic activity for the rapid reaction. This is applicable to combustion of gas mixtures containing hydrogen, for which the first catalyst structure (32) may comprise uncoated oxidized aluminum-containing ferritic steel, while the second catalyst structure (34) may incorporate Pt and/or Pd in an alumina support. Exhaust gases may also be recycled to the inlet (26) to inhibit combustion.

5 Claims, 3 Drawing Sheets

FOREIGN PATENT DOCUMENTS

| | | |
|---|---|---|
| DE | 198 55 769 A1 | 6/2000 |
| DE | 10056673 | 5/2002 |
| DE | 101 10 465 A1 | 10/2002 |
| EP | 0625481 | 11/1994 |
| EP | 0718031 | 6/1996 |
| EP | 0968958 | 5/2000 |
| EP | 1232790 | 8/2002 |
| EP | 1266701 | 12/2002 |
| EP | 1287884 | 3/2003 |
| FR | 2824755 | 11/2002 |
| WO | WO 94/19647 | 9/1994 |
| WO | 01/51194 A1 | 7/2001 |
| WO | WO 01/76730 | 10/2001 |
| WO | WO02064248 | 8/2002 |
| WO | 03/033131 A1 | 4/2003 |
| WO | 2004/078642 A1 | 9/2004 |
| WO | 2005/102511 A1 | 11/2005 |
| WO | WO 2007/003353 | 1/2007 |

OTHER PUBLICATIONS

Foreign Search Report from a Related Application, Sep. 7, 2006.
Foreign Search Report from a Related Application, Jun. 22, 2007.
Foreign Search Report for Application No. PCT/GB2007/050220 dated Jul. 24, 2008.
Twigg et al., "Metal and Coated-Metal Catalysts," Structured Catalysts and Reactors, Chapter 3, pp. 59-89, 1998.

* cited by examiner

CATALYST STRUCTURE FOR A RAPID REACTION

This invention relates to a catalyst structure suitable for use in a catalytic reactor containing channels for a chemical reaction, to a process carried out using such a catalyst structure, and to a chemical reactor incorporating such a catalyst structure.

A process is described in WO 01/51194 and WO 03/033131 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to longer chain hydrocarbons of higher molecular weight, which are usually liquids or waxes under ambient conditions. The two stages of the process, steam/methane reforming and Fischer-Tropsch synthesis, require different catalysts, and catalytic reactors are described for each stage. In each case the catalyst may comprise a corrugated foil coated with catalytic material. The steam/methane reforming reaction is endothermic, and the requisite heat may be provided by a catalytic combustion process in an adjacent channel, for example using palladium and/or platinum on alumina as catalyst. As described in WO 2004/078642 (GTL Microsystems AG), hydrogen may be supplied to the combustion channels to provide at least part of the combustible gases; for example hydrogen may be obtained from the tail gases after the Fischer-Tropsch synthesis. Gas mixtures that contain hydrogen, typically in combination with other combustible gas components such as methane, carbon monoxide, gaseous short-chain hydrocarbons, alcohols or ketones, provide the benefit that the catalytic combustion reaction can be readily initiated even when the reactor is cold. However the presence of hydrogen may lead to a problem: the hydrogen component undergoes catalytic combustion very readily with such a conventional combustion catalyst, and the temperature in the vicinity of the inlet, where the combustible gases and air are supplied to the combustion channel, may rise rapidly to above 1000° C. despite the heat that is removed by the endothermic reaction in adjacent channels.

According to a first aspect of the present invention a compact catalytic reactor comprises a channel for a rapid reaction having an inlet for a gas mixture to undergo the reaction, wherein the said channel is provided with two different catalyst structures, a first catalyst structure in the vicinity of the inlet and a second catalyst structure further from the inlet, such that a gas mixture supplied to the inlet flows past the first catalyst structure and the second catalyst structure, wherein the second catalyst structure has catalytic activity for the rapid reaction but the first catalyst structure has less catalytic activity for the rapid reaction.

The first catalyst structure (in the vicinity of the inlet) may have little catalytic activity for the rapid reaction and little or no catalytic activity for other reactions, or alternatively it may have catalytic activity for other reactions between the gases, where those other reactions inhibit the rapid reaction, for example where they are endothermic and/or decrease the concentration of the rapidly reacting gas component.

The invention is particularly applicable to the catalytic combustion reaction involving hydrogen, as this is a rapid reaction which can generate hot-spots.

In the context of combustion of a fuel comprising a mixture of gases including hydrogen and methane, the first catalyst structure would for example have little catalytic activity for the combustion of hydrogen and almost no catalytic activity for combustion of methane at temperatures up to 800° C. Consequently the rate at which the fast reaction occurs at the start of the channel is suppressed, so that the rate of temperature increase is also reduced. An initial temperature peak is consequently avoided. A significant quantity of the component with the fast reaction kinetics indeed reacts as it passes the first catalyst structure, but this occurs in a longer residence time than with a conventional catalyst and so more slowly, and so that the rate at which the heat is produced by combustion is more closely matched to the rate at which the heat is transferred to and absorbed in the adjacent channel for the endothermic reaction.

Preferably the first catalyst structure (that in the vicinity of the inlet) extends for a length that is at least 5%, but preferably no more than 50% of the total length of catalyst within the channel, and preferably the activity of the catalyst in the first catalyst structure is such that between 20% and 80% of the rapid reaction has occurred by the time that the gas mixture reaches the end of the first catalyst structure. The activity of the catalyst in the second catalyst structure is preferably such that the reaction has completed by the time that the gas mixture leaves the channel. The catalytic activity of the first catalyst structure for the rapid reaction should be no more than 0.2 times that of the second catalyst structure, for example about 0.1 times.

The first catalyst structure may for example comprise an oxidised steel alloy whose surface has only very slight catalytic activity for the rapid reaction. For example it has been found that combustion of gas mixtures which include hydrogen are catalysed to a slight extent by an oxidised aluminium-containing ferritic steel such as iron with 15% chromium, 4% aluminium, and 0.3% yttrium (e.g., Fecralloy (TM)). When this metal is heated in air it forms an adherent oxide surface of alumina, which protects the alloy against further oxidation and against corrosion, and surprisingly has slight catalytic activity. It has previously been suggested that this alloy is suitable for use as a catalyst substrate when coated with a ceramic (such as alumina) containing catalyst material, but no such ceramic coating or catalyst material is required by the first catalyst of the present invention. Alternatively the first catalyst structure may include a ceramic coating without added catalyst material. The second catalyst structure, in contrast, may contain a ceramic coating on a metal substrate, the ceramic coating acting as a support for catalytic material such as platinum and/or palladium. For further control of the reaction rate the loading of the catalytic material may vary along the length of the second catalyst structure.

In another aspect, an alternative or complementary approach is to add non-combustible components to the combustible gas mixture. Preferably the catalyst structures are shaped so as to define a plurality of longitudinal sub-channels, for example the catalyst structure may comprise a foil with longitudinal corrugations, such that the sub-channels have a smallest transverse direction less than 2 mm, and preferably less than 1 mm. Consequently the flow conditions for the gas mixture within the catalyst structure is laminar flow, and the introduction of a non-combustible component reduces the rate at which oxygen diffuses to the catalyst sites, and so suppresses the rate of hydrogen catalytic combustion.

Other benefits can arise by introducing appropriate additional components to the gas mixture. For example the addition of steam to the combustion gas mixture may reduce the reaction rate; if the combustion mixture includes both steam and methane, then in the presence of a noble metal combustion catalyst this mixture may undergo a reforming reaction which is endothermic, moderating the tendency to produce hotspots. The reforming reaction generates hydrogen, and so enhances heat generation by combustion further along the channel from the inlet. Both steam and carbon dioxide can be added to the combustible gas mixture by recycling a proportion of the exhaust gases from the combustion channel back to mix with the air and combustible gases supplied to the inlet.

If the fuel gas contains both carbon monoxide and hydrogen, then the first catalyst structure may incorporate a catalyst for methanol synthesis or for methanation synthesis, so as to reduce the concentration of both carbon monoxide and hydrogen at the start of the channel, and to ensure that combustion occurs more slowly, as methanol and methane undergo catalytic combustion less rapidly than hydrogen. Alternatively a catalyst for methanol synthesis or for methanation synthesis may be arranged upstream of the combustion channel.

For combustion channels longer than about 0.5 m the pressure drop along the combustion channel may become significant. When comparing reactions in a short channel (of length say 0.3 m or less) to those in a much longer channel it is therefore inappropriate to scale purely on residence time (or contact time). In another aspect of the present invention, preferably the flow rates are such that the combustion channel gas flow velocity at the exit, under operating conditions, that is to say the actual velocity at which the hot gases emerge, does not exceed 30 m/s. Preferably it does not exceed 20 m/s.

In another aspect of the present invention, where combustion is required along a longer channel, the rate of combustion and hence the temperature profile along the length can be controlled by appropriate staging of the fuel addition into the channel. For example natural gas with a small amount of hydrogen might be introduced into the air stream as fuel at a first stage. The quantity of hydrogen is merely sufficient to initiate combustion. This first stage of combustion depletes the air of oxygen and consequently increases the concentrations of steam and carbon dioxide. At a second stage additional fuels are added to the gas mixture already in the combustion channel, and these additional fuels may include a larger proportion of hydrogen because of the diluting effect of the steam and carbon dioxide (as discussed above).

The reactor may comprise a stack of plates. For example, first and second flow channels may be defined by grooves in plates arranged as a stack, or by spacing strips and plates in a stack, the stack then being bonded together.

Alternatively the flow channels may be defined by thin metal sheets that are castellated and stacked alternately with flat sheets; the edges of the flow channels may be defined by sealing strips. The stack of plates forming the reactor is bonded together for example by diffusion bonding, brazing, or hot isostatic pressing. By way of example the plates (in plan) might be of width in the range 0.05 m up to 1 m, and of length in the range 0.2 m up to 2 m, and the flow channels are preferably of height between 1 mm and 20 mm or less (depending on the nature of the chemical reaction). For example the plates might be 0.3 m wide and 1.5 m long, defining channels 5 mm high. The first and second flow channels alternate in the stack, so there is good thermal conduction between fluids in those channels. For example the first flow channels may be those for combustion (to generate heat) and the second flow channels may be for steam/methane reforming (which requires heat). The catalyst structures are inserted into the channels, and can be removed for replacement, and do not provide strength to the reactor, so the reactor itself must be sufficiently strong to resist any pressure forces or thermal stresses during operation.

Where the channel depth is no more than about 3 mm, then the catalyst structure may for example comprise a single shaped foil. Alternatively, and particularly where the channel depth is greater than about 2 mm, the catalyst structure may comprise a plurality of such shaped foils separated by substantially flat foils. To ensure the required good heat transfer, for example in a steam/methane reforming reactor, the combustion channels are preferably less than 5 mm deep. But the channels are preferably at least 1 mm deep, or it becomes difficult to insert the catalyst structures, and engineering tolerances become more critical.

The invention will now be further and more particularly described, by way of example only, and with reference to the accompanying drawings, in which.

The invention would be applicable to a process for making synthesis gas, that is to say a mixture of carbon monoxide and hydrogen, from natural gas by steam reforming. This is a well-known reaction, and is endothermic; the heat may be provided by combustion. The synthesis gas may, for example, subsequently be used to make longer-chain hydrocarbons by a Fischer-Tropsch synthesis. The overall process (i.e. converting natural gas to synthesis gas to hydrocarbons) produces hydrogen as a byproduct, and this may be used as part of the combustion fuel.

Figure 1:
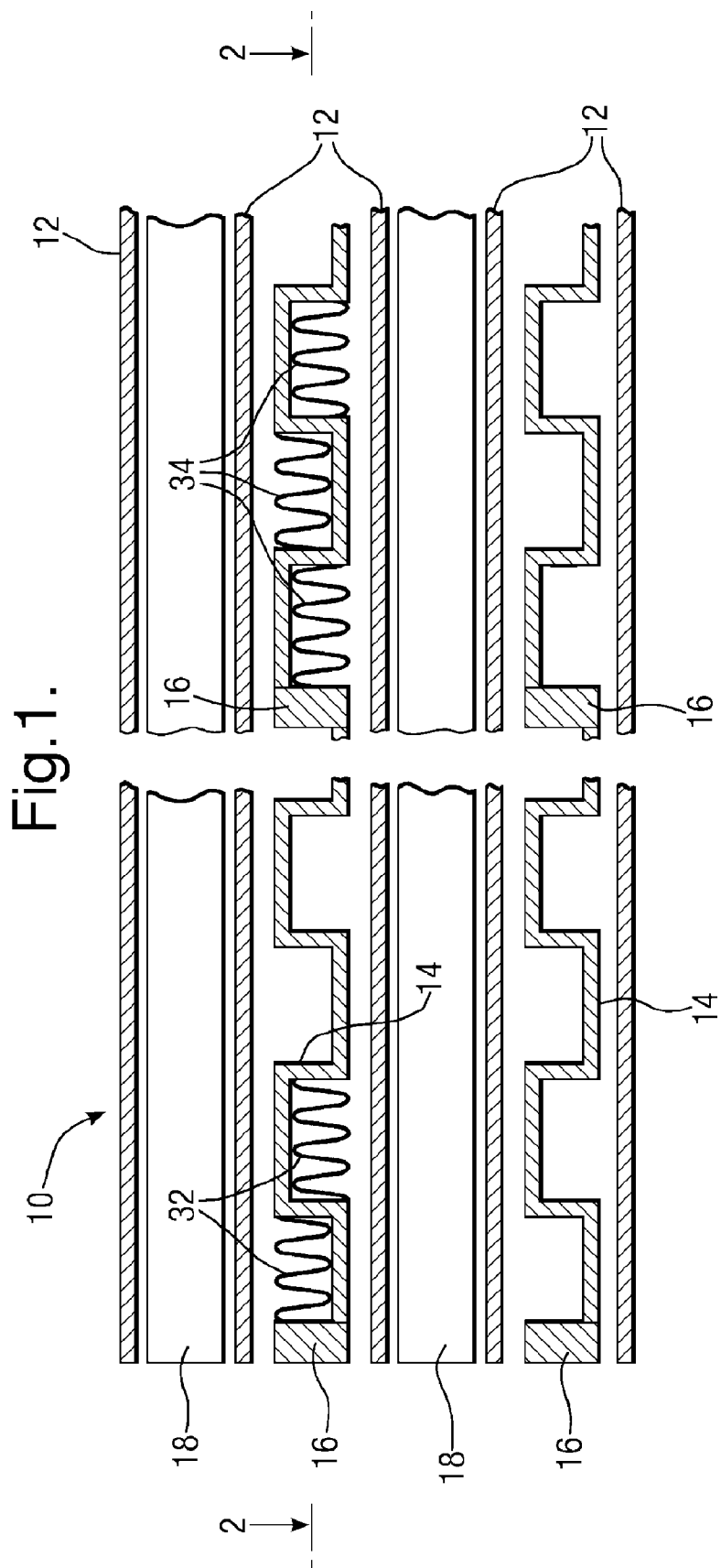
FIG. 1 shows a sectional view of part of a reactor block (this being a part view on the line 1-1 of FIG. 2)

Referring now to FIG. 1 a reactor block 10 is shown in section and with the components separated for clarity. The reactor block 10 consists of a stack of flat plates 12 of thickness 1 mm spaced apart so as to define channels for a combustion process alternating with channels for the reforming reaction. The combustion channels are defined by castellated plates 14 of thickness 0.75 mm. The height of the castellations (typically in the range 1 to 4 mm) is 3 mm in this example, and 3 mm thick solid edge strips 16 are provided along the sides of each plate 14, and successive ligaments (typically spaced apart by between 10 and 50 mm are 20 mm apart (the arrangement being described in more detail below). The channels for the reforming reaction are of height 4 mm, being defined by similar castellated plates 18 in which successive ligaments (typically spaced between 10 and 50 mm apart) are 25 mm apart, and with edges strips 19 (see FIG. 2). The orientations of the castellated plates 14 and 18 are such that the resulting flow channels are in orthogonal directions.

Figure 2:
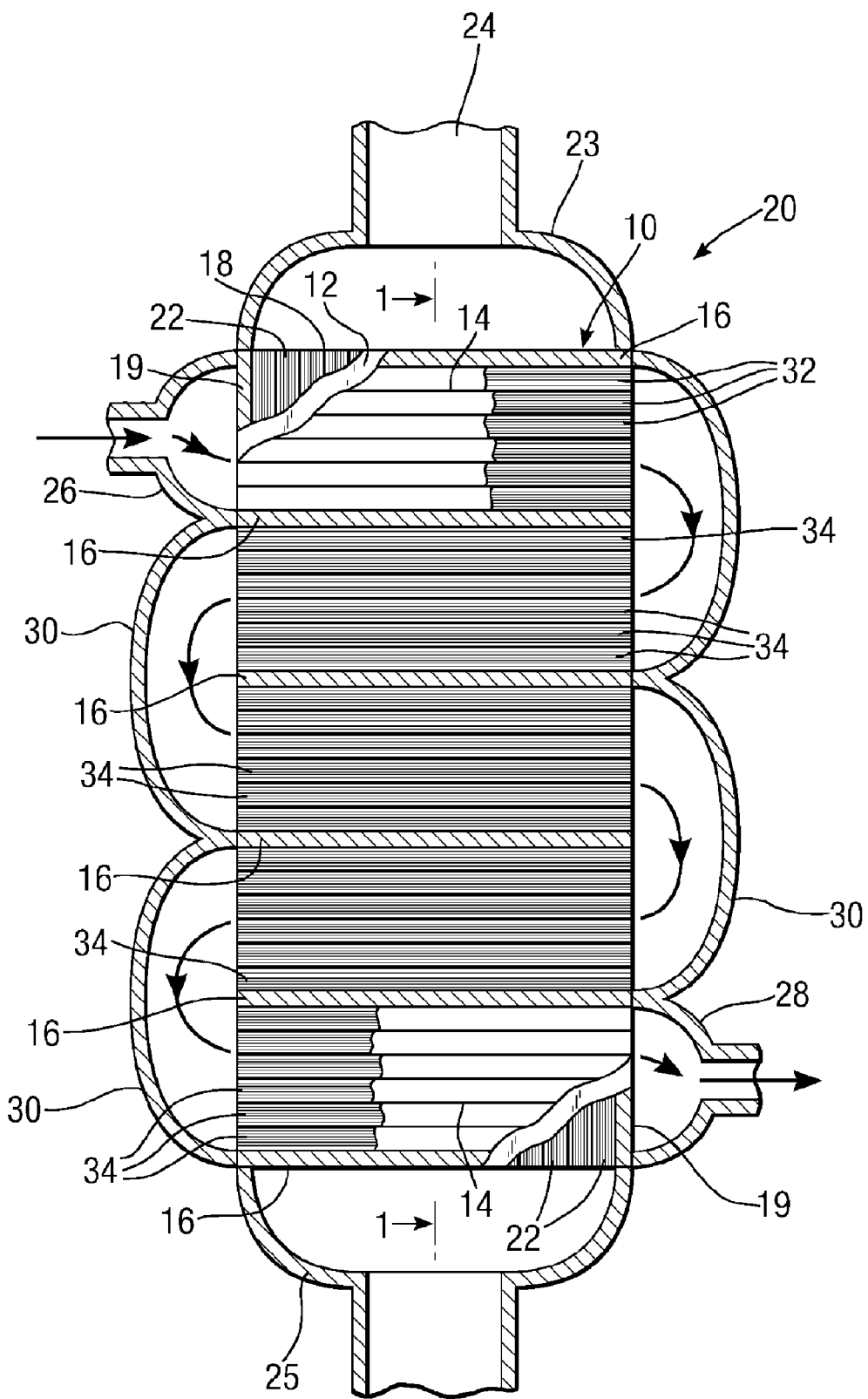
FIG. 2 shows a sectional view of a reactor incorporating the reactor block of FIG. 1, partly broken away (corresponding to the line 2-2 of FIG. 1)

Referring now to FIG. 2, a steam/methane reforming reactor 20 is shown in section, with the reactor block 10 partly broken away. As mentioned above, the reactor block 10 consists of a stack of flat plates 12 separated from each other to define flow channels. The orientations of alternate channels in the stack are orthogonal. Each flat plate 12 is 0.5 m by 1.5 m in plan. The channels for the reforming reaction, defined by the castellated plates 18, extend straight through the reactor block 10 (from top to bottom as shown) from a header 23 to which the steam/methane mixture is provided through a pipe 24, to an outlet header 25. The channels for the combustion reaction are defined by castellated plates 14 each of plan area 0.5 m by 0.3 m, there being five such plates 14 laid side-by-side and separated by edge strips 16 on each flat plate 12. These combustion channels are supplied with combustible gas mixture through a header 26 of width 0.3 m (at the top of the left side as shown); there is a similar outflow header 28 for exhaust gases also of width 0.3 m at the diagonally opposite part of the reactor block 10 (at the bottom of the right side as shown); and there are linking headers 30 of width 0.6 m along the opposite sides of the reactor block 10; hence the gas flow path follows a serpentine route, traversing the width of the reactor block 10 five times between the headers 26 and 30. Hence the overall flow path for the combustion gases, as indicated by the arrows, is a zig-zag or serpentine path that is partially co-current relative to the flow in the reforming channels.

The stack is assembled as described above, and then bonded together to form the reactor block 10 for example by diffusion bonding. Corrugated metal foil catalyst carriers 22, each of length 1.5 m and of width equal to the ligament spacing (25 mm in this case), and which incorporate an appropriate catalyst, are then inserted into the channels for the steam reforming reaction. Similarly, corrugated metal foils 32 are inserted into the channels communicating with the combustion gases inlet header 26, and corrugated metal foils 34 are inserted into all the other combustion channels. (The foils 32 in the first combustion section and the foils 34 in the last combustion section are shown partly broken away in FIG. 2, and only a few of the foils 32 and 34 are shown in FIG. 1.)

In this example the corrugated foils 32 are of Fecralloy steel, heat treated to ensure an oxide surface, but without any ceramic coating and without deposition of any catalytic material. In contrast the corrugated foils 22 and 34 incorporate a metal foil substrate (which is also of Fecralloy steel), coated with a 30 to 50 μm thick layer of alumina impregnated with a suitable catalytic material. As regards the foils 22 the catalytic material is platinum/rhodium 1:1 mixture, while for the foils 34 the catalytic material is a palladium/platinum 3:1 mixture, in each case at a loading of 10% by weight of the alumina.

The arrows in FIG. 2 indicate that the reactor block 10 ensures that the combustion gases traverse the reactor block 10 five times; alternatively the reactor block may be designed so that the combustion gases might pass just once across the width, or more than once. In another alternative arrangement the combustion might occur in the vertical channels (in the plates 18) and the steam/methane reforming occur in the serpentine cross flow channels (in the plates 14).

It will be appreciated that the reactor design 20 is shown by way of example only. Where the one reaction takes place in a plurality of stages (as in FIG. 2), the gas flow between the successive passes or stages may take place through means other than the headers 30. For example in a similar manner to that described in WO 2005/102511 (GTL Microsystems AG), the gases might be arranged to flow between successive stages through apertures at end portions of the castellated plates 14 and end portions of the edge strips 16, so that the headers 30 could be smaller, or in some cases could be replaced by blank plates. In this case the foil inserts in the channels for that reaction would not extend right to the ends of the flow channels in the plates 14.

Figure 3:
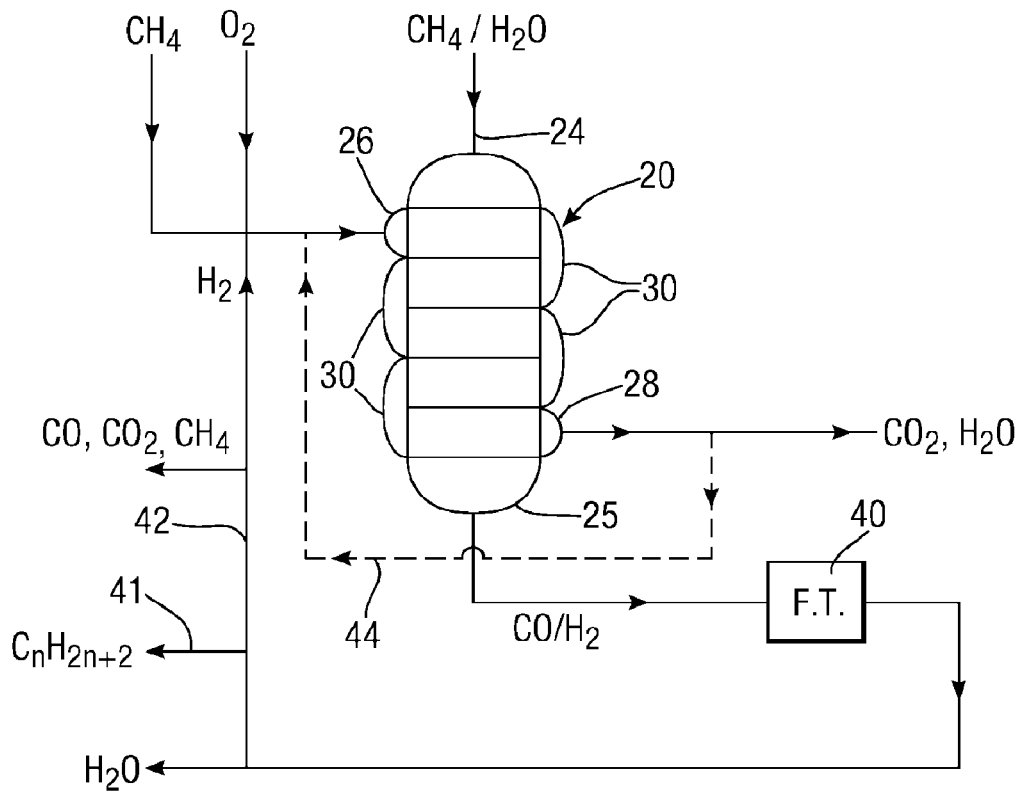
FIG. 3 shows a flow diagram of part of a chemical plant incorporating the reactor of FIG. 2.

Referring now to FIG. 3 the use of the reactor 20 is illustrated as a flow diagram of a plant for converting methane to longer chain hydrocarbons. A mixture of methane and steam is supplied to the duct 24, typically at a temperature of about 400° C., and the mixture is raised to a temperature of about 850° C. as it passes through the reforming channels of the reactor 20. The synthesis gas emerging from the output header 25 is supplied to a Fischer-Tropsch reactor 40 (represented symbolically), and the resulting mixture is condensed and separated into water, longer chain hydrocarbons 41, and a tail gas stream 42 which contains excess hydrogen. The details as to how the synthesis gas is processed before the Fischer-Tropsch reactor 40, and as to how the resulting gas mixture is processed after the Fischer-Tropsch reactor 40 are not relevant to the present invention. The hydrogen from the tail gas 42, which may for example be separated from other components such as carbon monoxide, carbon dioxide and methane using a membrane, is mixed with air (represented by $O_2$ in FIG. 3) and supplied to the inlet header 26 for combustion. As indicated above, the corrugated foil inserts 32 in the first section of the combustion channel do not include any added catalyst material, but nevertheless catalytic combustion does occur; the oxidised surface evidently has some limited catalytic activity. In this example therefore, the combustion occurs gradually through the first section, in which are the uncoated inserts 32, as typically between 20 and 80% of the hydrogen undergoes combustion in this section but the other fuel gas components do not undergo combustion, and then the residual hydrogen and the remaining fuel gas components undergo combustion when they reach the subsequent sections in which there are the catalytic inserts 34.

By way of example, the catalytic activity of equal lengths of the foils 32 and 34 can be compared in an experimental test in which the combustion gas mixture is passed over the foils, holding the temperature at the reactor wall constant at 100° C., and holding the gas composition and flow rate constant. It has been found that with 150 mm lengths of the oxidised Fecralloy steel foil inserts 32 only about 10% of the hydrogen undergoes combustion at this temperature, whereas with the conventional combustion catalyst foil inserts 34 about 90% of the hydrogen undergoes combustion at this temperature. It is thus evident that the catalytic activity of the oxidised foils 32 is only about 0.11 times that of the conventional combustion foils 34.

In a modification the activity of the catalytic material in the inserts 34 may be varied along the length of the combustion channels, there being less catalytic activity at the start of the inserts 34 than at the end. The grading of the catalytic activity may conveniently, in this example, be achieved by increasing the activity stepwise from one insert 34 to the next along the flow path, although grading of the catalytic activity along the length of an individual insert would also be an option. The grading of the catalytic activity may be achieved by varying the loading of the catalytic metal, from say 1% of the typical value at the start up to 100% of the typical value further along the combustion path. For the palladium/platinum catalyst referred to above the standard loading would be 10% by weight of the alumina. A loading of say 20% of the standard value may be obtained by providing 2% by weight over the whole width of the insert, or by introducing the catalytic material at a higher concentration but over only parts of the structure, for example 10% by weight over a fifth of the surface, for example in the form of stripes of width 1 or 2 mm. An alternative way of grading the catalytic activity is to coat the catalytic material on at least part of the insert with a ceramic coating acting as a diffusion barrier, to reduce the rate at which reactants, and in particular oxygen, diffuse to the catalyst sites.

If the catalytic insert is a stack of foils, rather than a single foil, its activity may be controlled by providing catalyst on only some of the foil surfaces.

As indicated in FIG. 3 methane may also be included in the combustible gas mixture supplied to the header 26. In one example the gas mixture supplied to the combustion inlet is 77% hydrogen, 0.4% CO, 7.7% $CO_2$ and 15% hydrocarbons (molar proportions), the hydrogen and small proportions of carbon oxides being obtained by membrane separation from a tail gas 42, and the hydrocarbons (principally methane) being provided from natural gas, these being mixed with air. If catalytic inserts 34 were to be provided in the first section of the combustion channels there would be a significant risk that hotspots would develop, and indeed the combustion catalyst could rise to a temperature above 1000° C. near the start of the combustion channel, because hydrogen undergoes rapid reaction, raising the temperature, and consequently raising the rates of combustion of other fuel components such as carbon monoxide and methane. Such hotspots would generate significant thermal stresses in the structure of the reactor 20, and also would reduce the efficiency of the process, as the desired temperature gradient along the combustion path should ideally rise gradually so that the maximum temperature (around 900° C.) is adjacent to the outlet of the reforming channels.

As an alternative to the use of the inserts 32, or as a supplement to their use, substantially inert components may be added to the mixture of fuel and air supplied to the combustion channels. For example steam or carbon dioxide may be introduced. Because the flow conditions within the inserts 32 and 34 are laminar, the addition of such an inert component reduces the rate at which oxygen diffuses to the catalyst sites, and this has a major influence on the rate of catalytic combustion of hydrogen. The addition of steam to the combustion gas mixture may shift the equilibrium of the combustion reaction, and consequently slow the rate of reaction. Alternatively the steam may react with methane present in the gas mixture, in the presence of a noble metal combustion catalyst, undergoing the endothermic reforming reaction and so removing heat from any incipient hotspots, and at the same time increasing the heat generation further along the flow channel because of the formation and subsequent combustion of the products of the reforming reaction: carbon monoxide and hydrogen.

One way in which this may be achieved is to recycle a proportion of the exhaust gases from the combustion channels emerging through the header 28, back to be mixed with the combustion gas mixture, as represented by the broken line 44 in FIG. 3.

A further method of controlling the thermal gradient along the reactor 20 is to introduce the fuel in stages. For example all the air may be introduced through the inlet header 26, but only part of the requisite combustible gases, the remaining combustible gases being introduced into the combustion gas flow through one or more of the subsequent headers 30. In a modification, methane with only a very small proportion of hydrogen (and the air) is introduced to the inlet header 26. The first stage of combustion depletes the gas stream of oxygen and increases the concentrations of carbon dioxide and steam. A hydrogen-rich tail gas can then be introduced at one or more subsequent stages without leading to the initial high reactivity that would be observed with air. In another modification methane and an excess of air (with no hydrogen) are introduced into a first combustion stage using a conventional combustion catalyst; and then a hydrogen-rich combustion gas is introduced into the gas mixture at a subsequent stage, the first catalyst structure encountered by this hydrogen-rich gas being one of low activity such as the catalytic inserts 32, and subsequent catalyst structures being of higher activity.

Figure 4:
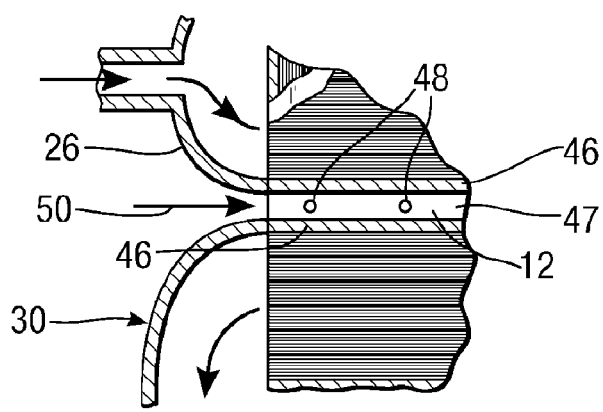
FIG. 4 shows a fragmentary sectional view of a modification to the reactor of FIG. 2.

Indeed both fuel and air may be added in stages along the combustion channel or channels. Even with a reactor in which combustion takes place in a single straight-through pass, and in which there are different inserts end to end in the combustion channels, hydrogen-rich fuel or additional combustion air may be introduced at various points along the channel through nozzles. This can lead to greater control of the thermal gradient through the reactor. For example, as shown in FIG. 4, in a modification to the reactor of FIG. 2 (performing combustion in the vertical channels and steam/methane reforming in the serpentine channels), the separating strips 16 within the reactor block 10 (apart from those at the ends) are replaced by spaced apart pairs of strips 46 with a gap 47 between them, the gap 47 being closed at the end that is within a header 30 and being open at the other end. This gap 47 may for example be 2 mm wide, and provides an inlet channel for fuel or air as indicated by arrow 50; narrow holes 48 are drilled through the adjacent plate or plates 12 so that the fuel or air supplied to the gap 47 flows through the holes 48 into the combustion channel.

An experiment has been carried with a combustion channel 1200 mm long in which the first 20% of the channel (240 mm) was provided with an oxidised Fecralloy foil 32. The remainder of the channel length was provided with a conventional catalyst insert, that is to say a corrugated foil 34 with an alumina coating containing Pd/Pt. The channel had two fuel injection points, one at the start of the Fecralloy foil 32 and the other about 40% along the channel length. The combustion air was pre-heated to 200° C. The fuel contained hydrogen in the range 70-80% mol, and the balance was a mixture of CO, methane and $CO_2$. When 40% of the fuel was injected into the first injection point the temperature in the combustion channel between the first and the second injection points was raised to a maximum of 450° C. The majority of the hydrogen in the injected fuel was oxidised between the first and the second injection points, but the methane remained unoxidised. The remaining 60% of the fuel was added at the second injection point, and the temperature in the combustion channel between the second injection point and the exit reached a maximum value of approximately 820° C., as the hydrogen and CO were oxidised downstream of the second injection point, raising the temperature sufficiently that the methane also underwent combustion. The combustion process was entirely stable with no evidence of hot spots. It is likely that the combustion products from the first stage and the resulting depletion of the available oxygen also assisted in stabilising the combustion process downstream of the second injection point.

If the fuel gas contains significant levels of both carbon monoxide and hydrogen, then the initial catalytic inserts may for example contain a catalyst for methanol formation, so that at least some of the hydrogen is converted to methanol in the initial stages. This again suppresses the initial rate of combustion of hydrogen, and helps achieve the desired temperature gradient along the reactor 20. The methanol will undergo combustion further along the channel. Alternatively a catalyst for methanol formation may be provided in a separate reactor bed upstream of the reactor 20.

It will be appreciated that the combustion channels in the reactor 20 make five passes each of length 0.5 m, so the total length is 2.5 m. This reactor is shown only by way of example. Typically the length of each combustion channel is between 0.2 and 1.6 m, and the number of passes is typically between one and five, so that the total length of the combustion channels may be as much as 8 m. Under such conditions it is inappropriate to attempt to scale the reactor design on the basis of residence time or contact time, as the necessary velocity would become very high and the consequential pressure drop would be excessive, requiring excessive power to provide the combustion air flow rate. The maximum exit velocity from the combustion channels, measured at the operating conditions (i.e. at the exit temperature of the gas and its exit pressure) should not exceed 30 m/s to avoid there being excessive pressure drops. Preferably the pressure drop over the entire length of the combustion channel is no more than 1 bar, preferably no more than 0.2 bar and more preferably no more than 0.1 bar.

It will be appreciated that the gas mixtures readily available for combustion will vary between different applications. For example in another situation, where steam/methane reforming is followed by pressure swing absorption to obtain a pure hydrogen stream, the remaining gas stream has been found to have the molar composition: 37% hydrogen, 27% CO, 24% $CO_2$ and 12% hydrocarbons. Although this composition is very different to that described above, it can be used for combustion in substantially the same reactor 20.

The reactor 20 described above is shown only by way of example, and it will be appreciated that it may be modified in various ways while remaining within the scope of the present invention. For example with the reactor 20 in which there are five successive passes for combustion, the low-activity inserts 32 might be provided in the first two passes rather than only in the first pass, or even in the first three passes. As mentioned above there might be only a single pass for the combustion gases, in which case there could be two separate inserts, the first being of low-catalytic activity (such as oxidised Fecralloy steel) and the second incorporating a combustion catalyst, arranged end to end in the channel. Alternatively there might be a single corrugated foil insert extending the whole length of the channel, in which there is no catalyst and no ceramic coating on the first part, but a combustion catalyst on the second part.

Although the inserts are described as comprising corrugated foils it will be appreciated that they might instead incorporate a different metal substrate, for example a corrugated fibrous mat. In any event they are preferably shaped so as to define a multiplicity of parallel flow sub-channels.

We claim:

1. A compact catalytic reactor comprising:
    a channel for a rapid reaction having an inlet in fluid communication with a gas mixture including hydrogen to undergo the rapid reaction, wherein the rapid reaction comprises combustion of hydrogen; and
    a first catalyst structure within the channel in the vicinity of the inlet and a second catalyst structure within the channel further from the inlet, such that a gas mixture supplied to the inlet flows past the first catalyst structure and the second catalyst structure;
    the first catalyst structure comprising an oxidized aluminum-containing ferritic steel alloy with an adherent alumina oxide surface, without incorporation of any additional catalytic material;
    the second catalyst structure having catalytic activity for the rapid reaction but the first catalyst structure having less catalytic activity for the rapid reaction;
    the second catalyst structure comprising a ceramic coating on a metal substrate, and a catalytically active material, the catalytically active material being platinum and/or palladium;
    the catalytic activity of the first catalyst structure for the rapid reaction being in the range from 0.1 to 0.2 times that of the second catalyst structure, wherein in a test in which the catalytic activity of catalyst structures of length 150 mm are compared by passing the hydrogen-containing gas mixture over the catalyst structures while holding the temperature at the wall of the channel at 100° C., the proportion of hydrogen that undergoes combustion over the first catalyst structure is between 0.1 and 0.2 times the proportion of hydrogen that undergoes combustion over the second catalyst structure;
    wherein the activity of the first catalyst structure for other reactions is no more than the activity for the rapid reaction.

2. A catalytic reactor as claimed in claim 1 wherein the first catalyst structure extends for a length that is at least 5%, but no more than 50% of the total length of catalyst within the channel.

3. A catalytic reactor as claimed in claim 1 wherein the activity of the catalytically active material is graded along the length of the second catalyst structure, being least active at the start.

4. A catalytic reactor as claimed in claim 3 wherein the catalytic activity is graded stepwise along the length of the second catalyst structure.

5. A catalytic reactor as claimed in claim 1 wherein the first catalyst structure has catalytic activity for other reactions between the gases which inhibit the rapid reaction.

* * * * *